United States Patent [19]

Clements

[11] 4,066,299
[45] Jan. 3, 1978

[54] APPARATUS FOR LOCATING A MALFUNCTIONING BRAKE CONTROL VALVE ON TRAIN

[75] Inventor: Roy Milton Clements, Danville, Calif.

[73] Assignee: Southern Pacific Transportation Company, San Francisco, Calif.

[21] Appl. No.: 797,764

[22] Filed: May 17, 1977

Related U.S. Application Data

[63] Continuation of Ser. No. 638,682, Dec. 8, 1975, abandoned.

[51] Int. Cl.² .............................................. B60T 17/22
[52] U.S. Cl. ................. 303/20; 246/169 R; 303/1
[58] Field of Search ............... 58/23 A, 23 AC, 24 A, 58/74; 235/92 T; 246/169 R, 169 D, 169 A; 303/1, 9, 18, 20, 25, 27; 318/603; 324/181; 340/168 R, 168 CC, 171 R

[56] References Cited

U.S. PATENT DOCUMENTS

| | | | |
|---|---|---|---|
| 3,197,632 | 7/1965 | Baughman | 246/169 A |
| 3,807,808 | 4/1974 | Souther | 303/1 |

*Primary Examiner*—Stephen G. Kunin
*Attorney, Agent, or Firm*—Lindenberg, Freilich, Wasserman, Rosen & Fernandez

[57] ABSTRACT

Each car on a freight train is equipped with what is called a brake control valve. This valve is in the automatic air brake system and causes the air brake on the individual car to be applied when the pressure in the main brake pipe which runs throughout the train is reduced by the engineer or by any other cause. Sometimes, the brake control valve will malfunction, thereby causing it to go into the emergency brake position, either during normal service braking or at other times. When it goes into the emergency position, the brake pipe opens to the atmosphere and the resulting sudden reduction in pressure at that point causes all of the brake control valves on the train to go into emergency position causing a full emergency brake application throughout the train. With long trains, quickly finding the malfunctioning brake control valve is quite a chore. This invention provides a method and means of almost immediately indicating the location of a defective brake control valve by timing a pressure wave front propagated by the malfunctioning valve to the front and rear ends of the train in response to separate transducers which transmit radio frequency (RF) signals to a receiver and separate counters which count clock pulses from the time of receipt of respective RF signals to determine difference in the time for the pressure wave to reach the ends of the train to determine the location of malfunction from one end or the center of the train, depending upon the clock pulse rate used.

9 Claims, 3 Drawing Figures

APPARATUS FOR LOCATING A MALFUNCTIONING BRAKE CONTROL VALVE ON TRAIN

This is a continuation, of application Ser. No. 638,682, filed Dec. 8, 1975, now abandoned.

BACKGROUND OF THE INVENTION

This invention relates to a method for rapidly locating a malfunctioning brake control valve that is causing an undesired emergency brake application to occur.

It is a well-known fact that freight trains can be as much as one mile or more in length. Accordingly, when a brake control valve malfunctions, it causes the brakes on the entire train to apply full emergency pressure and the entire train stops. The train crew must endeavour to find the car which has the malfunctioning brake control valve. In addition, the entire train must be walked from one end to the other and visually inspected to assure that no damage has been done during the emergency stop, or that there is no reason other than a malfunctioning brake control valve, to have caused the emergency brake application.

When the car with the malfunctioning brake control valve is located, the brakes in this car can be deactivated by closing a cock in the branch pipe from the main brake pipe to the brake control valve. At the first opportunity, the car with the malfunctioning control valve can be switched out of the train and repaired. However, means presently available to locate a malfunctioning brake control valve that is causing undesired emergency brake applications are restricted to very time-consuming procedures such as the one outlined below:

1. Close the angle cock on the brake pipe at approximately the middle of the train when the train is stationary. This will isolate the cars to the rear of the point where the angle cock is closed.

2. Make a brake application with the brake valve located in the operating cab of the locomotive. If the malfunctioning brake control valve is located in front of the point at which the angle cock was closed, it will initiate undesired emergency brake application. However, if the malfunctioning brake control valve is located in the rear portion, no emergency undesired application will result.

3. Assuming that a malfunctioning brake control valve is in the section of train in front of the point at which the angle cock was closed, it is then necessary to continue closing angle cocks and making brake applications gradually isolating sections of the train until such time as the car with the malfunctioning brake control valve is found. It must be realized that a malfunctioning brake control valve that is causing undesired emergency brake application cannot be found by mere visual inspection. It should, therefore, be appreciated that much time would be saved if some technique could be devised for indicating the malfunctioning brake control valve either on the road or after arrival at an intermediate terminal.

OBJECTS AND SUMMARY OF THE INVENTION

It is an object of this invention to provide a system for immediately indicating the location of a malfunctioning brake control valve on a train.

Another object of this invention is the provision of a novel and useful brake control valve signalling system.

The foregoing and other objects of the invention are achieved in an arrangement wherein the compressed air brake pipe at the head end of the train and at the rear end of the train are equipped with pressure actuated transducers, each of which when actuated can transmit a radio frequency (RF) signal at a different frequency or modulation to a radio receiver which may be located either with the train engineer or with the last car on the train. It is well known that the propagation wave of an emergency air reduction in the compressed air brake train line moves from the point at which air pressure drop is initiated, in both directions to each end of the train at a rate of 930 feet per second. Accordingly, the transducers at the front and back end of the compressed air brake line will be triggered by the moving air at a time determined by their distance from the location of the malfunctioning brake control valve which initiates emergency brake application.

One of the RF signals which is transmitted by the transducer at the front end of the train is received by the radio receiver and is applied to a first counter which is assigned to counting the interval elapsing after receiving that signal. The RF signal from the rear end of the train, which has a different frequency or modulation than the one transmitted from the front end of the train, is also received by the radio receiver and applied to initiate the operation of a second counter which is assigned to count the interval elapsing after receipt of the signal from the rear end of the train. Either both counters can be stopped manually after both counters have started running or, the first of these two counters which counts up to its full count turns itself off and also turns off the other counter. The difference in the count between the manually stopped two counters, or between the full count and the count in the counter which has not made a full count, represents the difference in time between the arrival of the signals at the front end and the rear end of the train. If the first counter has a less than full or lower count, then the bad order brake control valve is located between the middle of the train and a rear end. If the second counter has the remaining or lower count, then the bad order brake control valve is located between the middle of the train and the front end of the train. The distance in feet from one end or the other end of the train to the point of initiation of the signal in the air brake system, as indicated by which of the two counters has the higher count, is one-half of the length of the train in feet, minus 465 feet, times the difference in the receipt of the two time signals, as indicated by the difference in count between the two counters. If clock pulses used to drive the counters are generated at 465 pulses per second, the count difference indicates the distance of the defective brake control valve from the center of the train, towards the location of the first transducer to have been actuated for transmitting an RF signal.

DESCRIPTION OF THE PREFERRED EMBODIMENTS

As previously stated, a brake control valve is located on each car in a long train. The brake control valve normally operates to permit air to flow from the auxiliary reservoir under the car to the brake cylinder, causing the brake shoes to press against the wheels. However, it has an additional function when an emergency brake application is needed. In order to obtain this emergency function, the pressure in the brake pipe must be rapidly reduced. When this rapid reduction is sensed by the brake control valve, it permits air from both the auxiliary and emergency reservoir to flow directly to the brake cylinder and at the same time opens a connection between the brake pipe and atmosphere. The purpose of this opening is to cause a rapid reduction of the pressure in the brake pipe throughout the train when an emergency stop is needed thus causing the brakes to apply very rapidly and with increased pressure.

Figure 1:
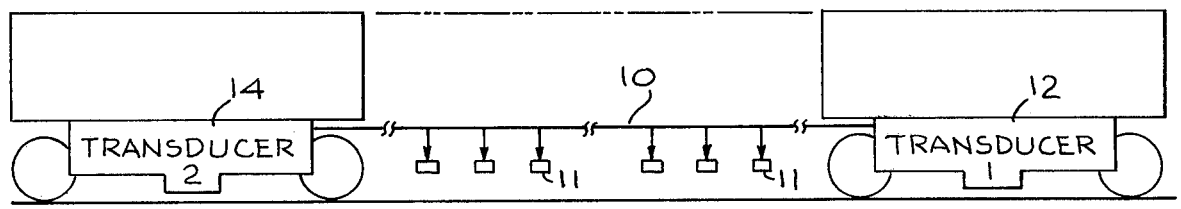
FIG. 1 illustrates a brake control line of a freight train with two transmitting transducers connected thereto in accordance with this invention.

In the event of a malfunctioning brake control valve, there is presently considerable delay in locating this malfunctioning brake control valve either on the road or after arrival at an intermediate terminal or both. This causes long and serious delays. In accordance with the invention, as shown schematically in FIG. 1, the air brake pipe 10 which extends throughout the train, by virtue of coupling together the brake pipes on each car, has a pressure actuated radio transmitting transducer 12 connected to the brake pipe at the front end of the train and a second pressure actuated radio transmitting transducer 14 (the radio of which transmits a signal on a different frequency or with a different modulation) connected to the brake pipe at the rear end of the train. The front end transducer 12, is designated as transducer No. 1, which when actuated transmits a signal which is modulated so that it is different from the signal transmitted by transducer 14 at the rear end of the train, which is designated as transducer No. 2. Transducer 1 and 2 include pressure actuated switches which respond to a drop in the brake line pressure which exceeds a predetermined value, such as experienced by the malfunction of a brake control valve. The pressure actuated switch turns on a radio transmitter. Pressure actuated switches which can turn on a portable radio transmitter are well known. The small arrows extending from the brake pipe 10 extend to the brake system 11 on each car.

Figure 2:
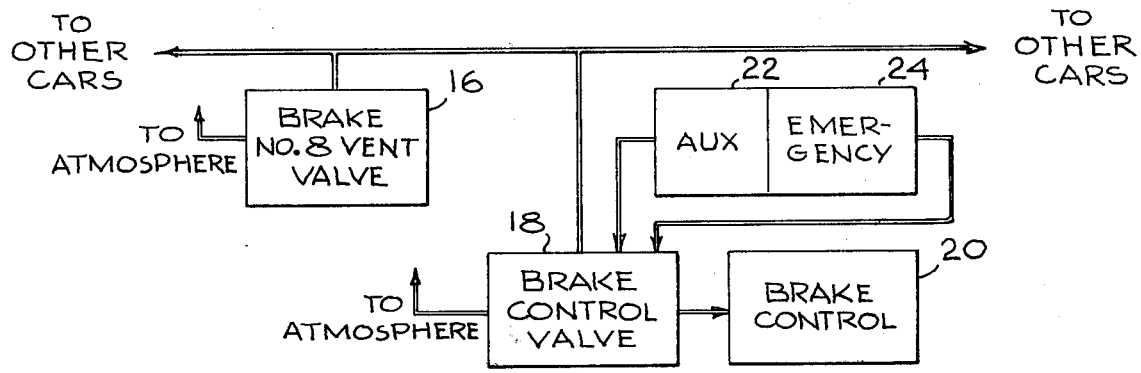
FIG. 2 is a schematic representation of the air brake system on a car of a train.

FIG. 2 shows a schematic drawing of the brake system on a car. Whenever the cars making up a train have more than 60 feet of brake pipe length, an additional emergency vent valve 16 is used on each long car. This is known as a No. 8 vent valve. When the rate of flow of air in the brake pipe exceeds the normal service level and reaches the emergency level, the No. 8 vent valve may opens to vent the brake pipe to emergency, in addition to the brake control valve performing this function.

Also connected to the brake pipe is the brake control valve 18 which, in response to pressure signals from the brake pipe, permits air to flow from the auxiliary reservoir 22 to the brake cylinder. When the pressure in the brake pipe is rapidly reduced at the emergency rate, the brake control valves operate so as to permit direct connection between the auxiliary reservoir and an emergency reservoir 24, and the brake cylinder so as to rapidly build up emergency brake pressure. In addition, the brake control valve 18 vents the train line directly to atmosphere. The air reservoirs 22 and 24, when the brakes are not in operation, are charged through special charging ports in the brake control 20.

Assuming that the length of the train in feet equals L, the distance from one end of the train to the location of a malfunctioning brake control valve which has initiated emergency application may be represented by X, therefore, the remaining length of the train equals (L-X).

It was previously stated that the propagation rate of an emergency brake application moves from the point at which the emergency is initiated at 930 feet per second. If $t_1$ is the time required for the emergency brake application initiated from the malfunctioning brake control valve to reach the front end of the train and $t_2$ is the time required for the emergency brake application to reach the rear end of the train from the location of the malfunctioning brake control valve, then an equation may be established as follows:

$$930 (t_2 - t_1) = (L - 2X)$$

$$X = L/2 - 465 (t_2 - t_1)$$

Figure 3:
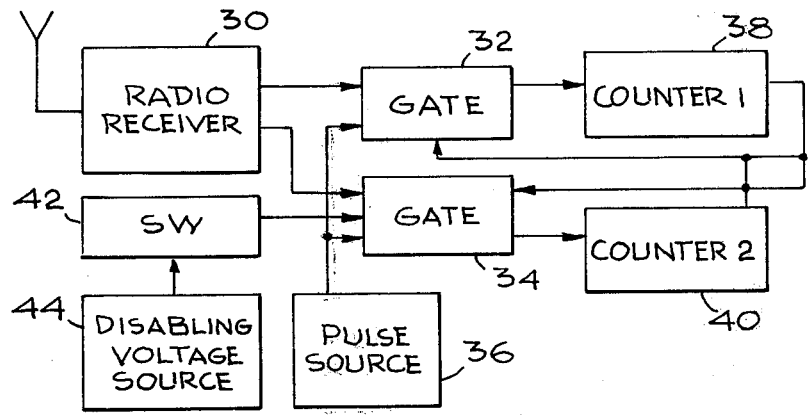
FIG. 3 illustrates the equipment required at one end of the train, in accordance with this invention.

Referring now to FIG. 3, there may be seen a schematic drawing of the equipment required at one end of the train for determining the distance of the malfunctioning brake control valve, which equipment has been rendered operative by the emergency brake application initiated by the malfunctioning brake control valve. Radio receiver 30 will receive discrete signals from both transducers at different times, depending upon the location of the malfunctioning brake control valve. The radio receiver will apply the received signals from the first and second transducers, which are modulated so that they are distinguishable by the radio receiver, to a first gate 32, when the signal is received from transducer No. 1, and to the second gate 34 when the signal is received from transducer No. 2. When either of the gates are enabled, they permit pulses from a pulse source 36 to be applied to the counters respectively 38 and 40.

Enabled gate 32 permits pulses from a source to be applied to a counter 38, which commences to count in response to these pulses. Enabled gate 34, permits pulses from source 36 to be applied to the counter 40 which commences to count in response to these pulses. In one embodiment of the invention, whichever one of the counters 38 or 40 attains its full count first, that counter's last count renders gates 32 and 34 inoperative and, as a result, the counters stop counting. The difference between the counts displayed by the counters is the equivalent time, $t_2 - t_1$, or the difference in time for the propagation of a signal from the point at which it occurred on the train to the two ends of the train. By using the formula previously given, this time difference may be converted into distance.

If counter 38 displays a greater count than counter 40, then, the point at which the emergency brake application was initiated, by a malfunctioning brake control valve, is located between the center of the train and the front. The distance X calculated is the distance from the front end of the train. If counter 40 displays the greater count, then the emergency brake application was initiated at a point between the center and the rear end of the train. The calculated distance X this time is the distance from the rear end of the train.

If the pulse source frequency 36 is made such that the counters count at 465 counts per second, and indicate their counts, then the difference will be equivalent to the distance in feet from the center of the train towards the transducer which keyed the counter with the higher count. This can be seen from the equation given previously, if placed in the form $(\frac{1}{2} - X) = 465 (t_2 - t_1)$.

In another embodiment of the invention, any time after the two counters start counting, a switch 42 may be activated. This applies a voltage from a disenable voltage source 44 to the gates 32 and 34. This disenables the gates, blocking further application of pulses to the counters whereby their counting is stopped. The difference in counts of the counters at that time is an indication of $(t_2 - t_1)$.

There has accordingly been described and shown above, a novel and useful system for rapidly determining the location of a malfunctioning brake control valve so that appropriate corrective action can be taken.

What is claimed is:

1. In a railroad train which has an air brake pipe extending the length of the train, and wherein each car is equipped with a brake control valve for venting said brake pipe when required for an emergency operation, means for locating a malfunctioning brake control valve which has vented said brake pipe, comprising:

a first and a second transducer means respectively at the head end of said train and at the rear end of said train coupled to said brake pipe for respectively transmitting a first radio frequency signal and a second radio frequency signal in response to being actuated by a change in air pressure in said brake pipe caused by a malfunctioning brake control valve, and receiving means at a single location on said train for receiving said first and second signals, counter means at said single location to which said received first and second signals are applied to produce an indication of the difference, $(t1-t2)$, in their times of receival caused by the difference in time required for the air pressure change caused by a malfunctioning brake control valve to move from said malfunctioning brake control valve through said brake pipe to said first transducer means and to said second transducer means, whereby the distance, X, of said operated valve means from one end of said train may be determined from the formula $X = L/2 - 465 (t1-t2)$, where L is the length of the train.

2. A system as recited in claim 1 wherein said counter means responsive to said first and second transducer means signals for producing an indication of the difference in the arrival times of said respective first and second signals respectively comprise a first and second counter, means for enabling said first counter to commence counting in response to the signal received from said first transducer means, means for enabling said second counter to commence counting in response to the signal from said second transducer means, and means responsive to the output of the first of said first and second counters to complete its count, to prevent further counting by said first and second counters, whereby the difference between the count in the counter which has not completed its count and the completed count of the other counter is a representation of the difference in receival times of said first and second signals.

3. A system as recited in claim 2 wherein there is included means for driving said counters to count at a rate of 465 counts/second whereby their count difference indicates the distance of said defective brake control valve from the center towards the location of the first of said means for transmitting to have been actuated.

4. A system as recited in claim 1 wherein said counter means responsive to said first and second transducer means signals for producing an indication of the difference in arrival times of said first and second signals respectively comprises a first and a second counter, means for enabling said first counter to commence counting in response to the signal received from said first transducer means, means for enabling said second counter to commence counting in response to the signal received from said second transducer means, and switch means to simultaneously stop the counting by said first and second counters whereby the difference between their respective counts is a representation of the difference in receival times.

5. A system as recited in claim 4 wherein there is included means for driving said counters to count at a rate of 465 counts/second whereby their count difference indicates the distance of said defective brake control valve from the center towards the location of the first of said means for transmitting to have been actuated.

6. A system as recited in claim 4 wherein there is included means for driving said counters to count at a rate of 930 counts per second, whereby their difference indicates the distance of said defective brake control valve from the end of the train transmitting a radio frequency signal first.

7. In a railroad train which has an air brake pipe extending the length of the train, and wherein each car is equipped with a brake control valve for venting said brake pipe when required for an emergency operation, and which brake control valve can vent said brake pipe when mulfunctioning, means for determining the difference in time $(t_1 - t_2)$ required for the air pressure change in a vented brake pipe to travel from a venting malfunctioning brake control valve to the front end of said train and to the back end of said train whereby the location of said malfunctioning brake control valve can be determined from the formula $X = L/2 - 465 (t_1 - t_2)$, where L is the length of the train, and X is the distance of the malfunctioning brake control valve from the end of the train at which the pressure change in the vented brake pipe arrives first, comprising, a pressure change actuated means at the head end and at the rear end of said train coupled to said brake pipe for respectively transmitting a first and a second radiofrequency signal when actuated by receiving a pressure change through said brake pipe from a malfunctioning brake control valve, means for receiving said transmitted first and second signals at one end of said train, and means to which said first and second signals are applied by said means for receiving for indicating the difference in time, $(t_1 - t_2)$, which was required for the air pressure change caused by a malfunction brake control valve to travel through said brake pipe to said respective pressure change actuated means at said head end and at said rear end of said train.

8. In a railroad train as recited in claim 7 wherein said means to which said first and second signals are applied comprise
   counter means responsive to the difference in the time of receiving said first and second signals to indicate the time difference, $(t_1 - t_2)$.

9. In a railroad train which has an air brake pipe extending the length of the train, and wherein each car is equipped with a brake control valve for venting said brake pipe when required for an emergency operation, and which brake control valve can vent said brake pipe when malfunctioning, means for determining the location of said malfunctioning brake control valve comprising
   a pressure change actuated means at the head end and at the rear end of said train, coupled to said brake pipe for respectively transmitting a first and second signal when actuated by receiving a pressure change through said brake pipe from a malfunctioning brake control valve,
   means for receiving said first and second signals at one end of said train,
   first and second counter means to which said received first and second signals are respectively applied to enable them to commence counting upon the application of said respective signals,
   means for driving said counter means at a rate of 465 bits per second when they are enabled to count whereby their count difference is an indication in feet of the distance of said malfunctioning brake control valve from the center of the train in the direction of the one of said pressure actuated means which was actuated first.

* * * * *